United States Patent [19]

Manwiller et al.

[11] Patent Number: 4,755,555

[45] Date of Patent: * Jul. 5, 1988

[54] POLYIMIDE MOLDING RESINS AND MOLDED ARTICLES

[75] Inventors: Carl H. Manwiller, Christiana; Waifong L. Anton, Claymont, both of Del.

[73] Assignee: E. I. du Pont de Nemours and Company, Wilmington, Del.

[*] Notice: The portion of the term of this patent subsequent to Nov. 11, 2003 has been disclaimed.

[21] Appl. No.: 928,950

[22] Filed: Nov. 10, 1986

Related U.S. Application Data

[63] Continuation-in-part of Ser. No. 727,811, Apr. 26, 1985, Pat. No. 4,622,384.

[51] Int. Cl.$^4$ .................... C08G 73/10; C08G 69/26
[52] U.S. Cl. ...................................... 524/607; 528/353
[58] Field of Search ....................... 524/607; 528/353

[56] References Cited

U.S. PATENT DOCUMENTS

| | | | |
|---|---|---|---|
| 3,179,631 | 4/1965 | Endrey | 260/78 |
| 3,249,588 | 5/1966 | Gall | 269/47 |
| 4,107,153 | 8/1978 | Akiyama et al. | 528/322 |
| 4,225,702 | 9/1980 | Makino et al. | 528/353 |
| 4,413,117 | 11/1983 | Reiter et al. | 528/353 |
| 4,489,185 | 12/1984 | Schoenburg | 528/353 |
| 4,535,115 | 8/1985 | Bakshi et al. | 528/353 |
| 4,599,396 | 7/1986 | Takekoshi et al. | 528/185 |
| 4,622,384 | 11/1986 | Manwiller | 528/353 |
| 4,629,777 | 12/1986 | Pfeifer | 528/353 |

FOREIGN PATENT DOCUMENTS 981543 1/1962 United Kingdom .
980855 1/1963 United Kingdom .

*Primary Examiner*—Lucille M. Phynes
*Attorney, Agent, or Firm*—Donald W. Huntley

[57] ABSTRACT

Particulate polyimide molding resin characterized by high surface area and low crystallinity and molded articles prepared therefrom having unusually high toughness.

11 Claims, 7 Drawing Sheets

EFFECT OF WARM ACETIC ACID ON TENSILE STRENGTH OF POLYIMIDE RESINS

- ● COMPARATIVE EXAMPLE N SINTERED AT 405°C
- × EXAMPLE 18 SINTERED AT 380°C
- ○ EXAMPLE 18 SINTERED AT 405°C

COMPARATIVE TENSILE PROPERTIES
-GRAPHITE FILLED RESINS

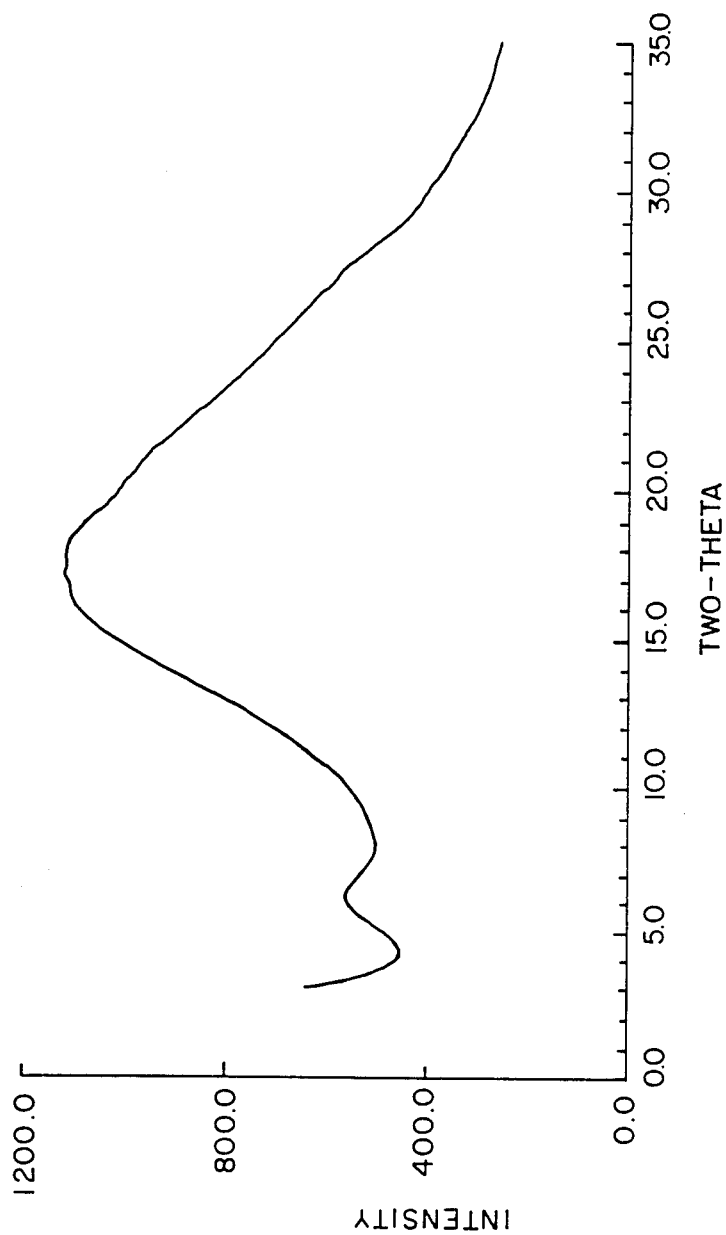

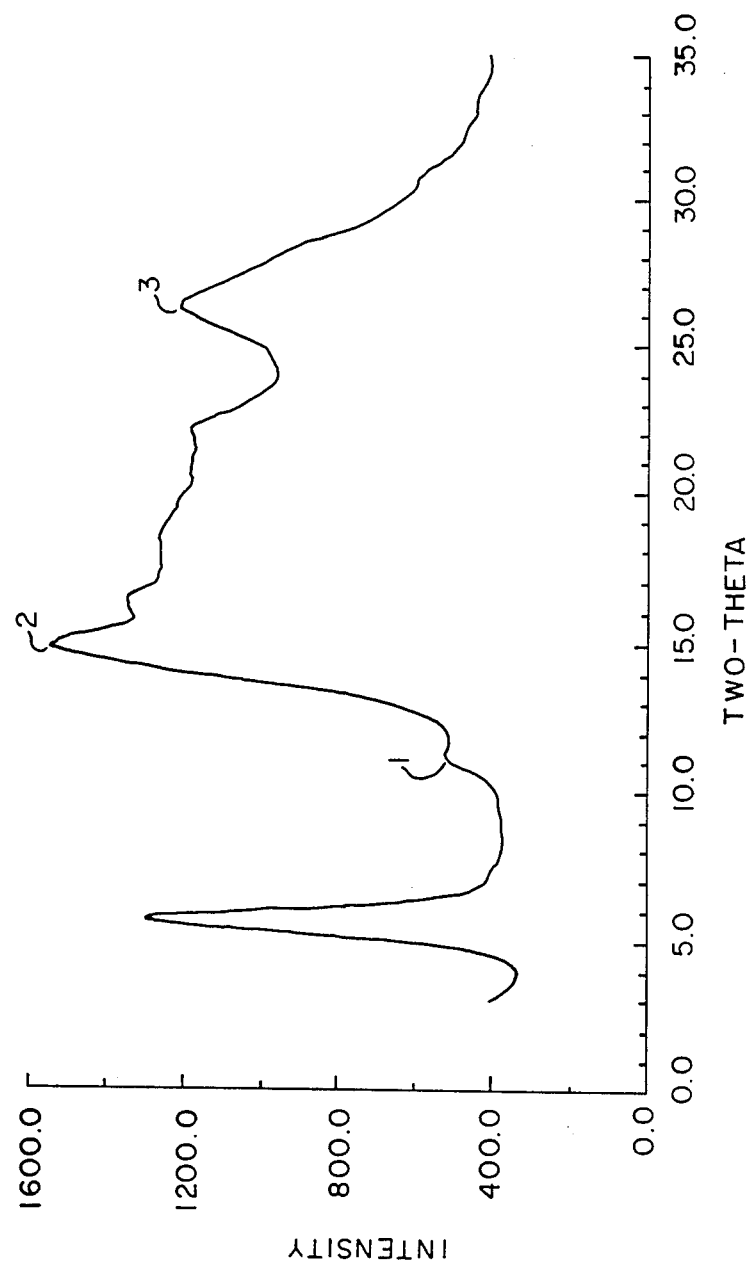

POLYIMIDE MOLDING RESINS AND MOLDED ARTICLES

CROSS-REFERENCE TO RELATED APPLICATION

This is a Continuation-in-Part of copending application Ser. No. 727,811, filed Apr. 26, 1985, now U.S. Pat. No. 4,622,384, granted Nov. 11, 1986.

BACKGROUND OF THE INVENTION

Aromatic polyimide materials are generally prepared by the reaction of an organic diamine with a tetracarboxylic acid dianhydride to form a polyamide acid, with subsequent conversion of the polyamide acid to a polyimide. Techniques for the preparation of such polymers are found, for example in Endrey, U.S. Pat. No. 3,179,631, British Pat. No. 981,543, and Gall, U.S. Pat. No. 3,249,588. The Endrey patent involves simultaneously converting the polyamide acid to the polyimide and precipitating the polymer from solution. An alternative technique previously suggested and illustrated in example 7 of the Endrey patent involves first precipitating the polyamide acid and subsequently converting the polyamide acid to polyimide by thermal or chemical means. This results in resins having low crystallinity and low surface area. The processes shown in the Gall patent result in polyimides having high surface area and high crystallinity.

Polyimides are used industrially in a wide variety of applications. For example, polyimides can be formed into a shaped article such as a film, or can be compounded into a coating enamel. Still other uses for such resins are in molding applications, in which polyimide in particulate form is fabricated into various configurations that can be used in a variety of technically demanding environments such as jet engines, business machines, automotive components and diverse industrial equipment. Such molded polyimide parts are capable of withstanding high temperatures and exhibit excellent bearing properties, good electrical properties and excellent creep resistance. However, continuing effort has been directed to the improvement of the mechanical properties of these resins, such as toughness, which would permit their use in a still broader range of high temperature environments.

SUMMARY OF THE INVENTION

The present invention provides an improved polyimide molding resin which is characterized by excellent toughness in a molded configuration.

Specifically, the instant invention provides, in solid particulate polyimide, the polyimide having the recurring unit

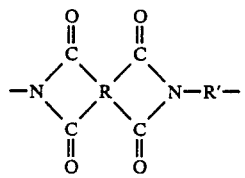

wherein R is a tetravalent radical containing at least one 6-carbon atom ring characterized by benzenoid unsaturation and wherein the four carbonyl groups are attached directly to different carbon atoms in the radical and wherein each pair of carbonyl groups is attached to adjacent carbon atoms in a 6-membered benzenoid ring of the radical, and wherein R' is a divalent radical containing at least one six-carbon atom ring, each ring characterized by benzenoid unsaturation, and, when at least two rings are present in R', no more than one of the valence bonds is located on any one of the rings, the particles having a surface area of greater than 20 square meters per gram, the improvement wherein the polyimide repeating unit contains less than two flexible linkages and the polyimide is substantially amorphous.

The invention also provides molded articles of this polyimide, which, when molded to a density of at least about 1.30 g/cc and without filler, exhibit improved tensile elongation and tensile strength over molded articles of the same polymer in its crystalline form.

The invention further provides, in a process for the preparation of a solid particulate polyimide by the reaction of (1) at least one organic diamine of the formula H 2 N—R'—NH 2 , wherein R' is a divalent radical containing at least one six-carbon atom rings, each ring characterized by benzenoid unsaturation, and, when at least two rings are present in R', no more than one valence bond is located on any one of said rings, and (2) at least one aromatic tetracarboxylic acid dianhydride and converting the resulting product to polyimide, the improvement which comprises:

(a) reacting the diamine and the dianhydride in a solvent having a pH of about from 8.0 to 10.0;

(b) maintaining the concentration of the solution resulting from the reaction of the tetracarboxylic acid dianhydride and the organic diamine at about from 1 to 15% polymer;

(c) bringing the polymer solution into contact with a nonsolvent for the resulting polymer at a temperature of about from 0° to 65° C.;

(d) maintaining the ratio of the nonsolvent and original polymer solvent such that the combined solvent and nonsolvent contains no more than about 70% solvent; and (e) agitating the mixture of polymer solution and nonsolvent to bring the nonsolvent and the solution into intimate contact so as to provide a surface area in the polyimide resin of greater than about 20 square meters per gram.

BRIEF DESCRIPTION OF THE FIGURES

FIGS. 7 and 8 are representative x-ray diffraction curves of substantially amorphous and crystalline polyimides, respectively.

DETAILED DESCRIPTION OF THE INVENTION

Figure 1:
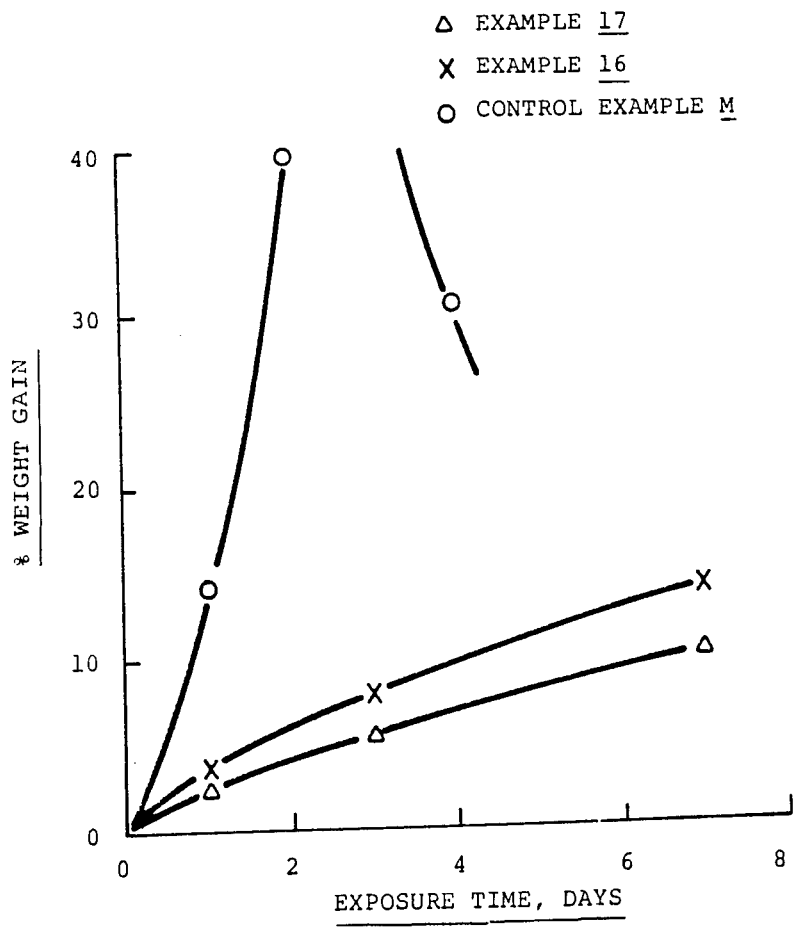
FIGS. 1, 2 and 3 are graphical illustrations of the performance of molding resins of the present invention compared to prior art resins when immersed in sodium hydroxide solutions.

The reactants used to prepare the present polyimide compositions are those described in Gall U.S. Pat. No. 3,249,588, hereby incorporated by reference. In addition to those reactants specifically disclosed in the Gall patent, reactants can be used in which $R_2$, $R_3$, and $R_7$, as described in Gall, are partly or fully halogenated.

The present invention is based on the discovery that rigid, normally crystalline polyimides of the type described in the Endrey patent, when prepared under process conditions as defined herein, can be made in a particulate form which is characterized by high surface area and a substantially amorphous crystalline state. These particulate polyimides, when molded using high pressure according to conventional techniques, give products which are characterized by a significant improvement in toughness. Depending on the composition of the polyimide, tensile strengths can be improved by as much as 3 fold (300%). At the same time, elongation at break of these products can be improved as much as 10 fold (1000%).

By contrast, polyimides which are not rigid or which exhibit low crystallinity, when prepared by conventional solution-phase imidization, will benefit little or not at all from the formation of a substantially amorphous molding resin.

The present invention is applicable, as noted above, to polyimides which are normally crystalline and rigid, that is, the polyimide repeating units of which contain less than two flexible linkages. Such polyimides include rod-like polymers in which both the dianhydride and the diamine moieties from which the polyimide is prepared are composed exclusively of para-phenylene rings or other rigid rings such as biphenyl or naphthyl groups. Less rigid polyimides can also be used in accordance with the present invention, so long as the polyimides contain less than two flexible linkages in the polyimide repeating unit. Examples of such flexible linkages are —O—, —S—, —CH2—, —SO2—, —C(CF3)2—, —(C=O)—, —C(O)—NH—, or -13 C(O)—O—.

Compared to the para-substituted monomers, meta- or ortho- substituted aromatic diamines and dianhydrides also decrease crystallinity in the polymer. Accordingly, such positional isomerization is considered to be a disrupting flexible linkage in the context of the present invention.

The present invention is applicable to polyimides as defined above that are normally crystalline. Crystalline is used in its conventional sense, that the x-ray diffraction scan obtained from the polymer is characterized by distinct peaks in the angular region of the scan dominated by chain-chain interactions. These crystalline peaks are the equatorial reflections (Miller indices hk0 for a polymer where the polymer chain-axis is coincident with the c-axis of the unit cell). The angular region containing the more intense equatorial reflections would generally be between 10 degrees and 35 degrees 2-theta when observed with Cuk-alpha radiation (0.15418 nm). Polyimides commonly are characterized by the presence of a distinct meridional peak (Miller indices 001 or 002, as discussed above) at an angle below 10 degrees 2-theta, and this should not be considered to contradict the lack or presence of distinct peaks. More specifically, the lack of distinct peaks in the region between 10 degrees and 35 degrees 2-theta can be tested by the lack of any distinct minima in this region other than the low- and high-angle limits of the broad amorphous peak. A distinct minimum is characterized by having a slope or first derivative of zero where the curvature or second derivative is positive or concave upwards. A scan for this test is obtained on a well-aligned reflection powder diffreactometer employing a nickel filter or monochromating crystal and pulse-height analysis set to pass symetrically 90 percent of the characteristic copper radiation. Similarly, substantially amorphous is the lack of such distinct peaks as discussed above.

Typical x-ray diffraction scans are shown in FIGS. 7 and 8, which relate to substantially amorphous and crystalline polyimides, respectively. The crystalline scan in FIG. 8 exhibits distinct peaks 1, 2, and 3 in the angular region of the scan dominated by chain-chain interactions. These peaks are absent in the coresponding scan in FIG. 7.

Substantially amorphous crystalline character can also be indicated by a low Crystallinity Index, which is the ratio of coherent intensity arising from the crystalline region to the total coherent intensity arising from the crystalline and amorphous regions in the polymer powder, as derived from an X-ray diffractometer scan of the resin powder. Substantially amorphous crystalline character is generally indicated by a Crystallinity Index of less than about 15, particularly with those polyimides prepared from oxydianiline and pyromellitic dianhydride.

The polymer preparation involves the reaction of at least one organic diamine as defined herein with at least one tetracarboxylic acid dianhydride to form a polyamide acid. This polyamide acid is then precipitated from solution and subsequently converted to polyimide by heating. Within this reaction sequence, a careful control of the reaction parameters is needed to produce the improved polyimide compositions of the present invention, characterized by high surface area and low crystallinity. In addition to the structural requirements of the polyimide as noted above, the reaction parameters include the composition of the polymer solvent liquor; the polymer solution concentration; the solvent liquor to precipitation liquor concentration; the precipitation temperature; and the intensity of agitation in the precipitation environment.

In the preparation of the present polyimide compositions, the organic diamine reactant is generally first dissolved in a solvent. Solvents which can be used include those organic solvents whose functional groups will not react with either of the reactants to any appreciable extent, and which exhibit a pH of about from 8 to 10. The pH of the solvent can be measured by immersing a piece of water-moistened pH paper in the pure solvent. Such solvents include, for example, pyridine and beta-picoline. Pyridine has been found to be particularly satisfactory in the preparation of the polyimides of the present invention having a high surface area. In addition, up to about 40% by weight of non-basic solvent such as dimethyl acetamide (DMAc) or n-methyl pyrrolidone (NMP) can be included in the reaction solvent, so long as the solvent mixture remains within the pH range of 8 to 10 as noted above. This inclusion of a more polar non-basic solvent is preferred in those cases where insolubility of the polyamide acid in pyridine causes premature precipitation of low-molecular weight polymer.

The quantity of solvent is important in obtaining a product having a high surface area. In particular, the solvent should be present in such a quantity that the concentration of the polymeric reaction product of the diamine and dianhydride is about from 1 to 15% by weight of the solution, and preferably about from 1 to 10%.

In general, after dissolving the organic diamine in an appropriate solvent and in the required concentration, the dianhydride reactant is added to the reaction solution. In the addition of the dianhydride reactant, additional solvent can be used, provided that the final concentration of the reaction product in the solvent is about from 1 to 15%. If desired, however, the dianhydride can be introduced before or at the same time as the diamine.

The polyamide acid is precipitated from solution by the addition of a nonsolvent for the polyamide acid. Such nonsolvents can be selected, for example, from acetone, ketone solutions or liquid hydrocarbons having at least three carbon atoms such as n-octane, hexanes, toluene, liquid propane, cyclohexane, tetralin, halocarbons such as chloroform, methylene chloride and trichlorotrifluoroethane and esters such as ethyl acetate, aliphatic ethers such as diethyl ether and alcohols such as methanol. Of these, acetone, toluene and trichlorotrifluoroethane have been found to be particularly satisfactory. Combinations of the above solvents can also be used. The choice of non-solvent will vary with each polymeric composition, as will be evident to the skilled artisan.

The precipitation of the polyamide acid should be carried out at temperature of about from 0° to 65° C. Temperatures of about from 10 ° to 40 ° C. have been found particularly convenient.

The ratio in which the polymer solution and the nonsolvent are brought into contact is an important factor in obtaining the high surface area polyimides of the present invention. Specifically, the combined solvent and nonsolvent should contain no more than about 70% solvent. The solvent and nonsolvent are brought into intimate contact with agitation, so as to provide a surface area in the final polyimide, after conversion, of greater than about 20 m 2/ g. In general, more vigorous agitation will result in higher surface area.

After precipitation of the polyamide acid from the initial reaction solution, the polyamide acid is preferably washed with nonsolvent to remove solvent. Typically, the washing is carried out at ambient conditions with additional quantities of the precipitating liquid, generally in quantities of at least about three times the volume of the polyamide acid. Failure to substantially completely remove residual solvent will result in low surface area in the finished resin.

After washing the precipitated polyamide acid, it can be converted to polyimide by heating to a temperature of about from 100° to 200° C., and preferably about from 150° to 180° C. Temperatures in excess of 200° C. will result in lower toughness in the molded product, while curing temperatures below about 100° C. will give inadequate conversion of the polyamide acid to polyimide. Typically, the conversion of the polyamide acid to polyimide is carried out in an inert atmosphere such as nitrogen so as to prevent hydrolytic and/or oxidative degradation of the resin.

Depending on the particle size resulting from the precipitation of polyamide acid from the reaction solution, the particles of polyimide can be further modified, for example, by suitable grinding techniques, to provide a desirable particle size for handling and subsequent molding. The particulate polyimide can be molded under elevated pressures to a wide variety of configurations. It has been found to be particularly convenient to form the particulate polyimide at a pressure of about from 50,000 to 100,000 psi at ambient temperatures, followed by sintering at elevated temperatures, for example, for about 3 hours at about 400° C. These molding conditions typically result in a molded density of at least about 1.30 g/cc.

The resulting molded polyimide retains its substantially amorphous character. Polyimides prepared from oxydianiline (ODA) and pyromellitic dianhydride (PMDA), for example, when molded to a density of at least about 1.30 g/cc, exhibit a Crystallinity Index, as measured by x-ray diffraction, of less than about 15. These molded polyimides exhibit a tensile elongation of greater than about 20% as measured by ASTM procedure D-638, using tensile bars described in FIG. 17 of E-8. Moreover, the tensile strength is at least 12 kpsi. Accordingly, the present polyimide compositions are particularly well suited for structural components where outstanding resistance to high temperatures, combined with excellent toughness, is required. In addition, the present compositions demonstrate improved resistance to sodium hydroxide and acetic acid.

Fillers, and particularly carbonaceous fillers such as graphite, can also be used in the present polyimides to improve wear and frictional characteristics, while retaining, to a large extent, the improved tensile properties. For example, the incorporation of about from 2 to 10 weight % graphite in a polyimide prepared from ODA and PMDA will result in molded articles having an elongation of greater than about 18% and a tensile strength of greater than about 11.5 kpsi. The incorporation of about from 10 to 50 weight percent graphite will provide molded articles with greater than 4% elongation and a tensile strength of greater than about 7 kpsi. The graphite or other filler should be added prior to precipitation.

While the outstanding performance of the present products is not fully understood, it is believed to be a function of the high surface area combined with low crystallinity. Previous polyimide molding resins have been characterized either by high surface area and high crystallinity or low surface area and low crystallinity.

The present invention is further illustrated by the following specific examples, in which parts and percentages are by weight unless otherwise noted.

The specific surface area of a resin is the number of square meters of surface per gram of resin as measured by a nitrogen absorption technique. In these Examples, the measurements of this resin parameter were made using the standard BET procedure described by Barr and Anhorn in Chapter XII of "Scientific and Industrial Glassblowing and Laboratory Techniques" published in 1949 by Instrument Publishing Company.

EXAMPLE 1 AND COMPARATIVE EXAMPLE A

In Example 1, 60 parts of 4,4'diaminodiphenyl ether (ODA) was charged to a dry, nitrogen-blanketed reaction vessel. The ODA was flushed into the flask during the addition of 1500 parts of pyridine with agitation. After the ODA was dissolved, 64.5 parts of pyromellitic dianhydride (PMDA) was added, stepwise, and was completely flushed into the system with an additional 150 parts of pyridine. After one hour agitation at room temperature, the inherent viscosity was measured as 1.05, and the solution concentration was 7.0%.

The solution of polyamide acid in pyridine was pumped at a rate of 65 parts/minute to a continuous-flow precipitator having agitation blades enclosed in a glass envelope equipped for two inflow streams and one outflow stream. Acetone flow to the precipitator was controlled at 70 parts/minute with a valve and rotometer and resulted in a 46% pyridine concentration in the effluent slurry stream. The reaction and precipitation were carried out at room temperature. The slurry was filtered in a medium porosity filter. Mother liquor was removed from the filter cake via displacement washing with about 1600 parts of acetone. The acetone wet filter cake was dried at 160° C. and 25" Hg vacuum under nitrogen for 16 hours, converting the polyamide acid to polyimide. The polyimide resin was ground in a mill employing a 30-mesh screen.

In Comparative Example A, a polyimide was prepared from the same reactants, but simultaneously precipitated and converted from polyamide acid to polyimide substantially according to the procedure shown in Gall, U.S. Pat. No. 3,249,588, Example 3.

The resins were tested according to ASTM procedure D-638, using tensile bars described in FIG. 17 of E-8. Tensile bars were direct formed from both polyimides at 100,000 psi and room temperature and were sintered for 3 hours at 405° C. The bars were formed using the procedures described in Jordan, U.S. Pat. No.3,413,394.

Resin and molded product properties for the resins of Example 1 and Comparative Example A are shown in Table I.

TABLE I
PHYSICAL PROPERTIES

|  | Example A | Example 1 |
|---|---|---|
| Surface Area meter 2/gm | 60 | 40 |
| Crystallinity Index | 30 | 12 |
| Infrared % Imide | 90 | 90 |
| Apparent Density gms/cc | 0.20 | 0.15 |
| Mold Shrinkage % | 2.0-2.5 | 2.5-3.5 |
| Tensile Strength kpsi | 11.0 | 14.0 |
| Elongation % | 11 | 22 |
| Notched Izod Impact-ft-lbs/inch | 1.5 | 2.7 |
| Izod Impact Reversed Notch ft-lb/inch | 11.0 | 30.4 |

COMPARATIVE EXAMPLE B

A polyamide acid was prepared using a freshly prepared solution of 12.01 parts of highly purified 4,4'diamino-diphenyl ether in 118 parts of highly purified N,N-dimethylacetamide (DMAc). This solution was added rapidly to a freshly prepared solution of 12.83 parts of pyromellitic dianhydride dissolved in 165 parts of DMAc, using vigorous agitation. 47 parts of DMAc was used to complete the transfer of one solution into the other. The solutions were prepared in a nitrogen atmosphere. The polyamide acid solution resulting after completion of the reaction had an inherent viscosity of 1.12. A portion of the polyamide acid solution was diluted to twice its volume with DMAc and precipitated by high shear agitation in a mixer filled with toluene. A large volume of toluene was required, providing a ratio of precipitant to solution of greater than 10 to 1. Excess solvent was decanted and the precipitate was washed with fresh toluene in the blender. The precipitate was dried and heated under a stream of nitrogen at 100° C. overnight, and by raising the temperature to 325° C. for 8 hours.

It was formed into tensile bars at a pressure of 100,000 psi and room temperature and subsequently sintered for 3 hours at 405° C. It was evaluated for tensile properties and found to exhibit a Tensile Strength of 3.6 kpsi and an elongation of 6.4%.

EXAMPLE 2 AND COMPARATIVE EXAMPLE C

In Example 2, 7.25 wt percent polyamide acid in pyridine solution was prepared from the same monomers as in Example 1. 100 parts of the polymer solution were fed at 20 parts per minute into 150 parts of trichlorotrifluoroethane contained in a high shear mixer operating at room temperature. The precipitation was instantaneous and quantitative and the resulting slurry was filtered and washed with trichlorotrifluoroethane. The filter cake was dried at 160° C. for 16 hours at 25 inches of mercury vacuum under nitrogen purge. The dried resin was ground through a 30 mesh screen. The dried resin was fabricated into tensile bars according to ASTM procedure D-638, using tensile bars described in FIG. 17 of E8. The bars were formed at room temperature and 100,000 psi forming pressure and then free sintered for three hours at 405° C under 1 atmosphere with nitrogen purge. The tensile strength and elongation of the bars were measured as 12.0 kpsi and 20%.

In Comparative Example C, tensile bars were similarly molded from polyimide resin prepared according to the procedure of Gall, U.S. Pat. No. 3,249,588, Example 3, and sintered at the same time. Those bars had a tensile strength of 10.6 kpsi and 7% elongation. The Crystallinity Index of Comparative Example C was 27.1.

EXAMPLE 3

The procedure of Example 2 was repeated, except the trichlorotrifluoroethane was replaced with acetone as the precipitant liquid. Tensile bars from this resin were sintered with the bars from Example 1 and showed a tensile strength of 13.1 kpsi and 26% elongation. The x-ray diffraction Crystallinity Index of the resin was measured, and found to be 13.9, in contrast to the Crystallinity Index for Control Example C of 27.1.

EXAMPLE 4 AND COMPARATIVE EXAMPLE D

The procedure of Example 3 was repeated, except the polyamide acid-pyridine solution concentration was 3.5 wt % and contained 15 wt % of graphite on a polymer basis. The graphite was Dixon Type 200-09 with a 5 micron average particle size. The resin had an x-ray diffraction Crystallinity Index of 12.0. In Comparative Example D, polyimide resin of Comparative Example A, but also containing 15 wt % of 5 micron graphite, was tested and had an x-ray diffraction Crystallinity Index of 32. The resin of Example 4 had a tensile strength elongation of 11.2 kpsi and 18%. The control resin tensile strength elongation values were 10.1 kpsi and 8%.

EXAMPLE 5 AND COMPARATIVE EXAMPLE E

Example 3 and Comparative Example A were repeated, except pyridine was replaced with beta-Picoline. Polymer solution was fed to the blender at 250 parts per minute. The resin had a tensile strength of 12.6 kpsi and an elongation of 24%. The control resin in Comparative Example E had a tensile strength of 11.6 kpsi and 9% elongation.

The following examples are based on operation of a continuous precipitation system using polymer solutions as described in Gall U.S. Pat. No. 3,249,588. The polyamide acid solution is continuously passed to a precipitation vessel which is also supplied with a continuous flow of nonsolvent. The resulting slurry is then filtered and the filter cake is washed. The resulting polyamide is then dried in a vacuum tray drier at 175° C. to convert to polyimide and subsequently ground to pass through a 30 mesh screen.

The following series of examples demonstrates the response of the present resin properties to the concentration of pyridine in the precipitation environment.

EXAMPLE 6

In a continuous precipitation system, a nominally 7 wt % polyamide acid-pyridine solution was fed at 55 parts per minute and an acetone feed rate of 50 parts per minute. The concentration of pyridine in the precipitation environment was 51%, the temperature was nominally 25° C., and the agitator was operated at maximum speed.

The precipitated polymer was filtered, washed with nominally 3 cake volume of acetone, and dried for 16 to 20 hours at 175° C. at 25 in. of mercury vacuum. The dried resin was ground with a mill through a 30-mesh screen. The resin had a Crystallinity Index of 12.5, a surface area of 46.3 m2/gm, and a tensile strength/elongation of 12.9 kpsi/23%. A control resin prepared as in Comparative Example A had a Crystallinity Index of 27, a surface area of 56.8 m 2/gm, a tensile strength of 11.6 kpsi and an elongation of 9.5%.

The infrared spectrum of the resin (the absorbance ratio of the band at 725 cm −1 to the band of 1027 cm −1 and assuming the absorbance ratio of about 3.10 represents 100% imidization) indicated a degree of imidization of 89%. The control resin showed a degree of imidization of 100%.

EXAMPLE 7

Example 6 was repeated, except the acetone rate was 80 parts per minute and the concentration of pyridine in the precipitation environment was 39%. The resin had an x-ray diffraction Crystallinity Index of 9.9, a Surface Area of 55.3 m 2/gm, and a tensile strength of 13.3 kpsi and an elongation of 24%.

EXAMPLE 8

Example 6 was repeated, except the acetone rate was 42 parts per minute and the pyridine concentration in the precipitation environment was 55%. The resin had a Crystallinity Index of 12.8, a surface area of 36.4 m 2/gm, a tensile strength of 13.1 kpsi and an elongation of 25%. The infrared spectrum of the resin showed 92% imide.

EXAMPLE 9

Example 6 was repeated, except the acetone rate was 34 parts per minute and the pyridine concentration in the precipitation environment was 60%. The resin had an x-ray diffraction Crystallinity Index of 12.8, a surface area of 32.6 m 2/gm, and a tensile strength and elongation of 12.7 kpsi and 28%, respectively.

EXAMPLE 10

Example 6 was repeated, except the acetone rate was 28 parts per minute and the pyridine concentration in the precipitation environment was 65%. The resin had a tensile strength and elongation of 14.2 kpsi and 29%, respectively.

EXAMPLE 11

Example 6 was repeated, except the acetone rate was 22 parts per minute and the pyridine concentration in the precipitation environment was 70%. The resin had an x-ray diffraction Crystallinity Index of 11.8, a surface area of 22.7 m 2/gm and a tensile strength and elongation of 11.1 kpsi and 20%, respectively.

COMPARATIVE EXAMPLE F

Example 6 was repeated, except the concentration of solvent in the precipitation environment was 75% pyridine. The acetone feed rate was 18 parts per minute. The resin had a Crystallinity Index of 10.5, a surface area of 11.7 m 2/gm, and a tensile strength and elongation of 10.6 kpsi and 19%, respectively.

In Comparative Examples G-H, polyimide products were prepared in solvents having a pH less than about from 8 to 10.

COMPARATIVE EXAMPLE G 200 parts of a 9 wt % PAA in dimethyl acetamide solution, having a pH of about 7, was added to 1735 parts of toluene in a high shear mixer operating at room temperature. The slurry was filtered and washed with 3 cake volumes of toluene and dried at 175° C. for 18 hours at 25 inches of mercury vacuum under nitrogen. The dried resin was ground through a 30 mesh screen. The resin had a Crystallinity Index of 14.8, a surface area of 12.6 m 2/gm, and a Tensile Strength and elongation of 10.0 kpsi and 5.3%, respectively.

COMPARATIVE EXAMPLE H

Comparative Example G was repeated, except the PAA/DMAc solution was 3.5 wt % PAA. The Crystallinity Index of the resulting resin was 12.5, the surface area was 11.9 m 2/gm, and the Tensile Strength and elongation were 7.6 kpsi and 3.5%, respectively.

EXAMPLE 12-15 AND COMPARATIVE EXAMPLES I-L

In Examples 12 to 15 and Comparative Examples I-L, tensile bars were direct formed at 100,000 psi at room temperature from resin respectively prepared according to the present invention and by the simultaneous conversion and precipitation shown in Gall, U.S. Pat. No. 3,249,588, Example 3. The response of tensile strength and elongation to sintering temperature was determined for both resins as shown in the following Table II:

TABLE II

| Example | Sintering - °C. | TS/E - KPSI/% |
|---|---|---|
| 12 | 405 | 14.1/22 |
| I | 405 | 11.2/9.5 |
| 13 | 380 | 13.3/25 |
| J | 380 | 10.5/8.1 |
| 14 | 350 | 12.9/25 |
| K | 350 | 9.2/5.3 |
| 15 | 300 | 11.6/22 |
| L | 300 | 4.3/1.5 |

EXAMPLES 16-17 AND COMPARATIVE EXAMPLE M

Figure 2:
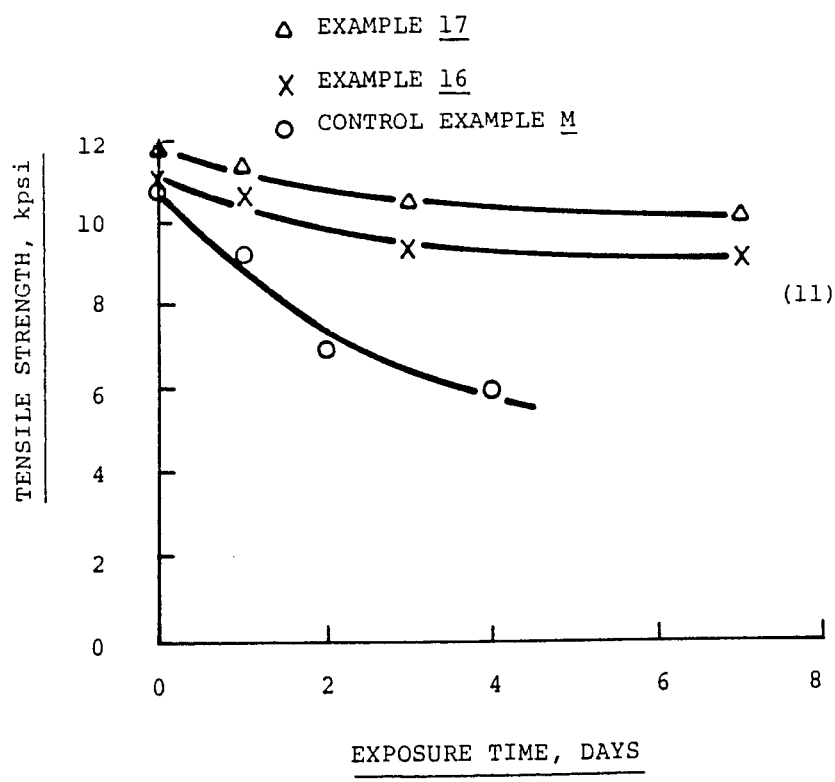
Figure 3:
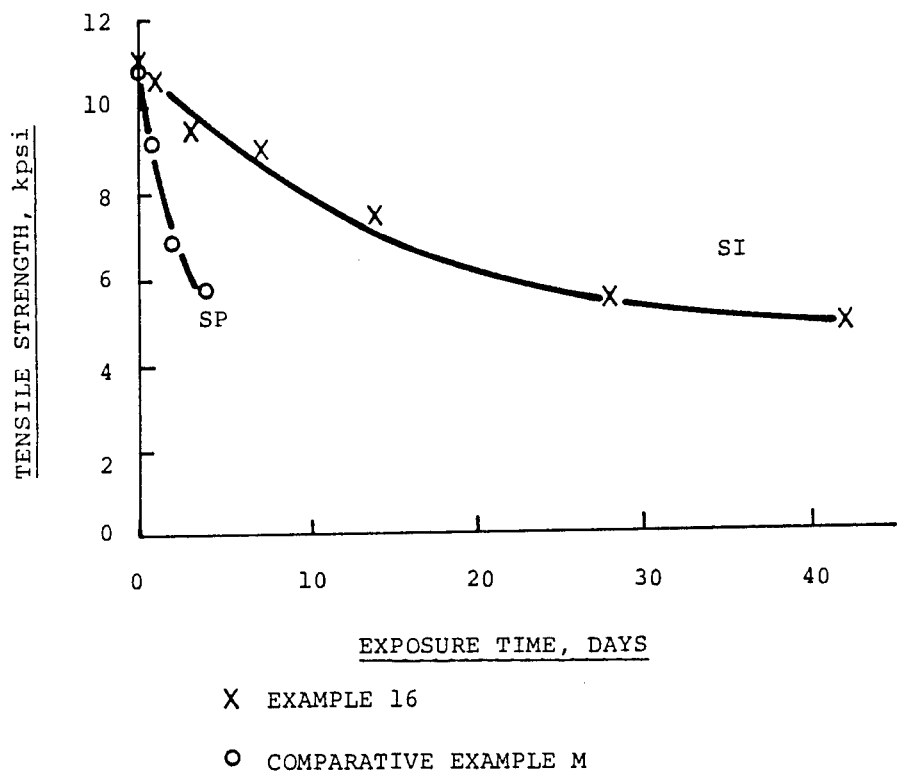

ASTM-E8 Tensile bars were direct formed at the standard 100,000 psi pressure from the same resin used in Examples 12-15 and Comparative Examples I14 L. Bars from both resins were sintered at 405° C. for 3 hours. In Example 17, a separate set of bars formed from the resin of the present invention was sintered at 380° C. for 3 hours. The bars were immersed in a 1% sodium hydroxide solution at 50° C. FIGS. 1 and 2 show a rapid gain in weight of the bars of Comparative Example M during the first two days' exposure followed by a rapid loss in weight as the bars soften and lose material at the surface. The bars of Example 16 gain weight at a much lower rate and maintain tensile strength superiority. The tensile strength after exposure is shown in FIG. 3 for Example 16 and Comparative Example M. The resin of the present invention loses Tensile Strength more slowly.

EXAMPLE 18 AND COMPARATIVE EXAMPLE N

Figure 4:
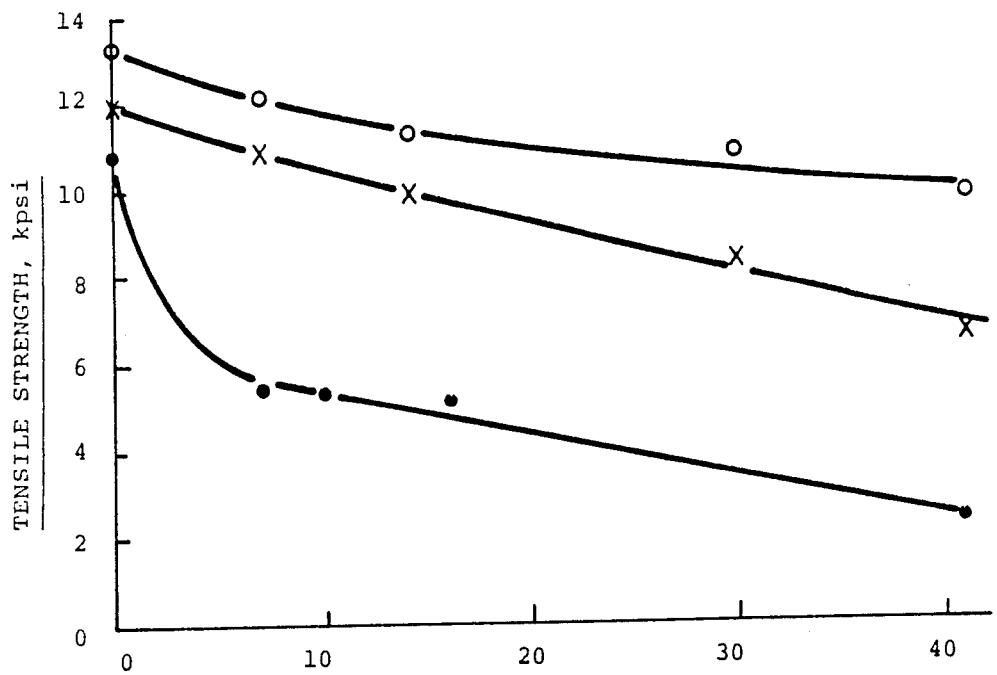
FIG. 4 is a graphical comparison of tensile strength when resins of the present invention and the prior art are exposed to refluxing acetic

The procedure of Example 16 and Comparative Example M was repeated, except the tensile bars were exposed to a refluxing (102°–103° C.) 15% aqueous acetic acid environment. FIG. 4 shows the remarkable tensile strength retention of the bars prepared from the present resin relative to the bars of the Comparative Example after 41 days' exposure.

The following examples illustrate the properties of graphite-filled resin of the present invention compared to graphite-filled resin of the prior art.

EXAMPLE 19

Using the continuous precipitation procedure of Example 5, a polyimide was prepared. A 6.5 wt % PAA/-pyridine solution containing 10 wt % (based on weight of polyimide resin to be formed) of Lonza KS-5 graphite having an average particle size of 5 microns was fed at 55 parts/minute. Acetone was fed at 35 parts/minute for a pyridine concentration of 60 wt % in the precipitation environment. The slurry was filtered in a 4 liter glass fritted funnel and washed with 3 cake volumes of acetone. The filter cake was tray dried at 170° C. for 16 hours at 25" H 2 vacuum with a nitrogen purge. The dried resin was ground in a Wiley mill through a 30 mesh screen. The resin had a Crystallinity Index of 12.9, a surface area of 26.5 m 2/gm, and a tensile strength and elongation of 12.3 kpsi and 25%, respectively.

EXAMPLE 20

Example 19 was repeated, except 20 wt % of the graphite was included in the PAA/pyridine solution. The resin had a Crystallinity Index of 13.8, a surface area of 25.0 m 2/gm, and a tensile strength and elongation of 10.7 kpsi and 19%, respectively.

EXAMPLE 21

Example 19 was repeated except 40 wt % of the graphite was included in the PAA/pyridine solution. The resin had a Crystallinity Index of 15.1, a surface area of 20.4 M 2 and gm, and a tensile strength and elongation of 8.8 kpsi and 7.2%, respectively.

EXAMPLE 22

Example 19 was repeated except 30 wt % of the graphite was included in the PAA/pyridine solution. The resin had a Crystallinity Index of 15.8, a surface of 23.8 m 2/gm, and a tensile strength and elongation of 9.2 kpsi and 12%, respectively.

EXAMPLE 23

Example 19 was repeated except 50 wt % of the graphite was included in the PAA/pyridine solution. The resin had a Crystallinity Index of 16.8, a surface area of 24.2 m 2/gm, and a tensile strength and elongation of 8.2 kpsi and 5.3%, respectively.

COMPARATIVE EXAMPLES O & P

The procedure of Examples 19–23 was repeated, except that a polyimide resin prepared according to Comparative Example A was used. The graphite concentrations were 15% and 37%, respectively.

The comparative Crystallinity Index and surface area for the graphite-filled resins of Examples 19–23 and Comparative Examples O & P are shown in Table III.

Figure 5:
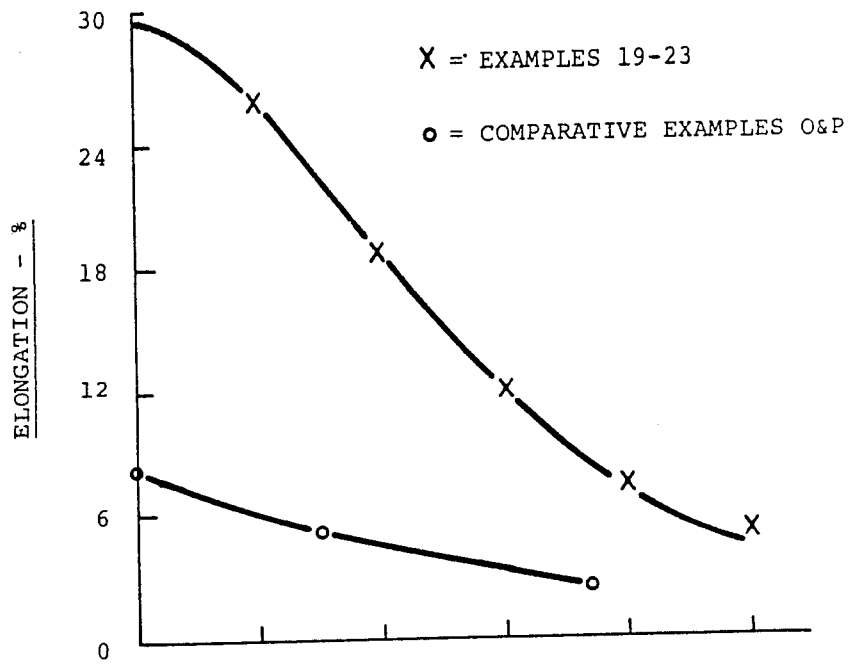
FIGS. 5 and 6 are graphical comparisons of tensile strength and elongation of resins of the present invention and the prior art containing various concentrations of graphite.
Figure 6:
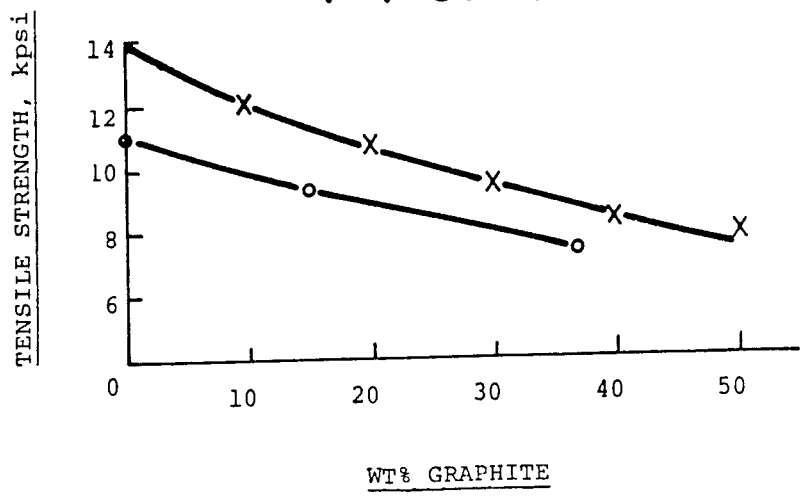

The tensile properties of graphite-filled resin of the present invention relative to graphite-filled resins of polymer prepared according to Comparative Examples O and P are shown in FIGS. 5 and 6.

TABLE III
COMPARATIVE CRYSTALLINITY AND SURFACE AREA VALUES FOR GRAPHITE FILLED POLYIMIDE RESINS

| Wt % Graphite | Index | Crystallinity M 2/gm | Sa Resin |
| --- | --- | --- | --- |
| 19 | 10 | 12.9 | 26.5 |
| 20 | 20 | 13.8 | 25.0 |
| 21 | 40 | 15.1 | 20.4 |
| 22 | 30 | 15.8 | 23.8 |
| 23 | 50 | 16.8 | 24.2 |
| O | 15 | 30 | 60 |
| P | 37 | 55 | 60 |

In the following Examples, after precipitation of the polyamide acid from the reaction solution, the slurries were filtered in fritted glass funnels. The filter cakes were displacement washed with approximately 3–5 cake volumes of nonsolvent, to completely remove the residual solvents. Failure to do so will result in low surface area in the finished resin. The filter cake is removed from the filter and is generally dried, for example, at 160 deg C. for 16–24 hours under 25 inches of mercury vacuum and with a nitrogen purge. Drying temperatures in excess of 200 deg C. will result in decrease in toughness in the molded product. The dry resin is ground or deagglomerated in a Wiley Mill equipped with a 30-mesh screen such as to limit the maximum particle size to about 600 microns. The finished resin and products molded from the resin are routinely characterized in terms of tensile properties. As appropriate, relative x-ray crystallinity, specific gravity and surface area were measured. In all Examples of the invention, the surface area was greater than 20 m2/gm and the polyimide was substantially amorphous.

EXAMPLE 24 AND COMPARATIVE EXAMPLE Q - PMDA/PPD

EXAMPLE 24

Para-phenylenediamine, 20.00 g, was dissolved in 250 mL of DMAc and 350 mL of pyridine at 60° C. Pyromellitic dianhydride, 40.15 g, was added together with a 20 mL rinse of pyridine to make a 9% polymer solution. A solution of inherent viscosity is 1.3 dl/g (in DMAc) was obtained. The exotherm of the polymerization brought the temperature of the solution up to 78° C. After stirring the solution at about 75° C. for 2.75 h, the solution was cooled to 65° C. and precipitated into acetone in a one-quart size blender operated at room temperature and at medium speed. About 400 mL of acetone was used for every 125 mL of polyamide acid solution. The precipitation was instantaneous and quantitative and the resulting slurry was filtered and washed with acetone. The filter cake was dried for 30 hours at 160° C. and 25" of mercury vacuum under a nitrogen purge. The dried resin was ground through a 30-mesh screen in a laboratory scale Wiley Mill. The dried resin was fabricated into tensile bars (ASTM E8) at room temperature and 100,000 psi forming pressure. The molded density of the bars is 1.40 g/cm3. The tensile bars were then free sintered for three hours at 405° C. under 1 atmosphere with nitrogen purge. The density of the bars increased after sintering to 1.47 g/cm3. The tensile strength and elongation of the bars were 7.5 kpsi and 1%.

The above procedure was repeated, but with precipitation of the polyamide acid solution in ethyl acetate and in methylene chloride. Tensile strength and elongation are 6.3/0.9 for both cases.

COMPARATIVE EXAMPLE Q

Para-phenylenediamine, 7.60 g, was dissolved in 75 mL of DMAc and 145 mL of pyridine. The solution was warmed to 60° C. and pyromellitic dianhydride, 15.26 g was added together with 20 mL of pyridine. A 9.7% by weight polymer solution with an inherent viscosity of 1.3 dL/g (in DMAc) was obtained. After stirring the solution for 30 minutes at 75° C., the polyamide acid solution was added dropwise using an additional funnel to flask containing 100 mL of pyridine and 50 mL of DMAc at reflux. After completion of addition of the polyamide acid solution, the solution was refluxed for another 2.5 hours. The resultant suspension was filtered and washed with 5 cake-volumes of acetone. The filter cake was dried for 30 hours at 150° C. under 25" of mercury vacuum under a nitrogen purge. The dried resin was ground through a 30-mesh screen in a Wiley Mill. The dried resin was fabricated into tensile bars at room temperature and at 100,000 kpsi forming pressure to give bars of molded density of 1.45 g/cm3. The bars were then free sintered for three hours at 405° C. under 1 atmosphere with nitrogen purge. The resultant tensile bars have a density of 1.49 g/cm3, with tensile strength and elongation of 3.2 kpsi and 0.3%.

COMPARATIVE EXAMPLES R & S - PMDA/APB-133

COMPARATIVE EXAMPLE R 1,3-Bis(3-aminophenoxy)-benzene (APB-133), 17.01g was dissolved in 170 mL of pyridine at 69° C. Pyromellitic dianhydride, 12.63 g, was added together with a 20 mL rinse of pyridine to make a 13.8% polymer solution. A solution with inherent viscosity of 0.34 dl/g (in pyridine) was obtained. The exotherm of the polymerization brought the temperature of the solution to 84° C. The solution was maintained at about 85° C. for 3h and then heated at refluxing pyridine (115° C.) for 3.5h. The precipitate was washed three times with acetone and the filter cake was dried for 24 hours at 180° C. and 25" of mercury vacuum under a nitrogen purge. The dried resin was ground through a 30-mesh screen in a laboratory scale Wiley Mill. The dried resin was fabricated into tensile bars (ASTM E8) at room temperature and 5,000 psi forming pressure. The tensile bars were then free sintered for three hours at 350° C. under 1 atmosphere with nitrogen purge. The tensile strength and elongation of the bars were 8.8 kpsi and 3.5%.

COMPARATIVE EXAMPLE S 1,3-Bis(3-aminophenoxy)-benzene (APB-133), 17.04 g was dissolved in 170 mL of pyridine and the solution was cooled to 5° C. Pyromellitic dianhydride, 12.72 g, was added together with a 20 mL rinse of pyridine to make a 13.8% polymer solution. A solution with inherent viscosity of 0.76 dl/g (in pyridine) was obtained. The exotherm of the polymerization brought the temperature of the solution to 26° C. The solution was maintained at about 25° C. for 2h. The polyamide acid solution was added dropwise to a refluxing pyridine (115° C.) containing 15 mL of acetic anhydride. The resultant suspension was refluxed for another 2 hours, and then the precipitate polyimide was filtered and washed three times with acetone and the filter cake was dried for 16 hours at 150° C. and 25" of mercury vacuum under a nitrogen purge. The dried resin was ground through a 30-mesh screen in a laboratory scale Wiley Mill. The dried resin was fabricated into tensile bars (ASTM E8) at room temperature and 5,000 psi forming pressure. The tensile bars were then free sintered for three hours at 350° C. under 1 atmosphere with nitrogen purge. The tensile strength and elongation of the bars were 13.2 kpsi and 5.7%.

EXAMPLE 25 AND COMPARATIVE EXAMPLE T - BPDA/PPD

EXAMPLE 25

Para-phenylenediamine, 7.82 g, was dissolved in 100 mL of DMAc and 130 mL of pyridine at 60° C. 3,3',4,4'-Biphenyltetra- carboxylic dianhydride, 21.17 g, was added together with a 20 mL rinse of pyridine to make a 10.8% polymer solution. A solution of inherent viscosity of 1.11 dl/g (in DMAc) was formed. The exotherm of the polymerization brought the temperature of the solution up to 74° C. The temperature of the solution was maintained at about 75° C. for 4h, the solution was cool to 65° C. and precipitated into acetone in a one-quart size blender operated at room temperature and at medium speed. About 400 mL of acetone was used for every 135 mL of polyamide acid solution. The precipitation was instantaneous and quantitative and the resulting slurry was filtered and washed with acetone. The filter cake was dried for 36 hours at 160° C. and 25" of mercury vacuum under a nitrogen purge. The dried resin was ground through a 30-mesh screen in a laboratory scale Wiley Mill. The dried resin was fabricated into tensile bars (ASTM E8) at room temperature and 100,000 psi forming pressure to give bars of density of 1.31 g/cm3. The tensile bars were then free sintered for three hours at 380° C. under 1 atmosphere with nitrogen purge. The resultant tensile bars have a density of 1.41 g/cm3, with tensile strength and elongation of 20.9 kpsi and 4.3% respectively.

The above procedure was repeated, except that the above polyamide acid solution has also been precipitated in (a) ethyl acetate and in (b) methylene chloride. The tensile strength/elongation are 16.6/2.4 for (a) and 17.0/2.5 for (b).

COMPARATIVE EXAMPLE T

Para-phenylenediamine, 7.57 g was dissolved in 80 mL of DMAc and 120 mL of pyridine. The solution was warmed to 60° C. and 3,3',4,4'-biphenyltetracarboxylic dianhydride, 20.70 g was added together with 20 mL of pyridine to give a 11.8% by weight polymer solution. The exotherm of the polymerization raised the temperature of the solution to 73° C. The solution was stirred at 60° C. for 0.5h. The polyamide acid solution was added dropwise using an additional funnel to flask containing 100 mL of pyridine at reflux. After completion of addition of the polyamide acid solution, the solution was refluxed for another 1.5 hours. The resultant suspension was filtered and washed with 5 cake-volumes of acetone. The filter cake was dried for 30 hours at 150° C. under 25" of mercury vacuum under a nitrogen purge. The dried resin was ground through a 30-mesh screen in a Wiley Mill. The dried resin was fabricated into tensile bars at room temperature and at 100,000 kpsi forming pressure to give bars of molded density of 1.34 g/cm3. The bars were then free sintered for three hours at 405° C. under 1 atmosphere with nitrogen purge. The resultant tensile bars exhibited a density of 1.41 g/cm3, with tensile strength and elongation of 6.9 kpsi and 0.9%.

EXAMPLE 26 AND COMPARATIVE EXAMPLE U - BPDA/ODA

EXAMPLE 26

Oxydianiline, 40.32 g, was dissolved in 820 mL of pyridine at 40° C. 3,3',4,4'-Biphenyltetracarboxylic dianhydride, 58.95 g was added together with a 20 mL rinse of pyridine to give a 10.6% polymer solution. A solution of inherent viscosity of 1.16 dl/g (in pyridine) was formed. The exotherm of the polymerization brought the temperature of the solution up to 55° C. The solution was heated to 70° C. for 5.5 hours.

The solution was then cooled to 65° C. and precipitated into methylene chloride in a one-quart size blender operated at room temperature and at medium speed. About 450 mL of methylene chloride was used for every 150 mL of polyamide acid solution. The precipitation was instantaneous and quantitative and the resulting slurry was filtered and washed with methylene chloride. The filter cake was dried for 15 hours at 160° C. and 25" of mercury vacuum under a nitrogen purge. The dried resin was ground through a 30-mesh screen in a laboratory scale Wiley Mill. The dried resin was fabricated into tensile bars (ASTM E8) at room temperature and 100,000 psi forming pressure to give bars of density of 1.25 g/cm3. The tensile bars were then free sintered for three hours at 380° C. under 1 atmosphere with nitrogen purge. The resultant tensile bars have a density of 1.30 g/cm3, with tensile strength and elongation of 17.1 kpsi and 21% respectively.

The above procedure was repeated, except that precipitation was carried out in acetone; results obtained are 17.0/21.

COMPARATIVE EXAMPLE U

Oxydianiline, 9.75 g, was dissolved in 170 mL of pyridine. The solution was warmed to 70° C. and 3,3',4,4'-biphenyltetracarboxylic dianhydride, 14.39 g was added together with 20 mL of pyridine to give a 11.5% by weight polymer solution with an inherent viscosity of 1.11 dl/g. The temperature of the solution rose to 81° C. The polyamide acid was stirred at 80° C. for 0.5h, and then added dropwise using an additional funnel to a flask containing 100 mL of pyridine at reflux. After completion of addition of the polyamide acid solution, the solution was refluxed for another 1.5 hours. The resultant suspension was filtered and washed with 3 cake-volumes of acetone. The filter cake was dried for 15 hours at 150° C. under 25" of mercury vacuum under a nitrogen purge. The dried resin was ground through a 30-mesh screen in a Wiley Mill. The dried resin was fabricated into tensile bars at room temperature and at 100,000 kpsi forming pressure to give bars of molded density of 1.29 g/cm3. The bars were then free sintered for three hours at 405° C. under 1 atmosphere with nitrogen purge. The resultant tensile bars have a density of 1.32 g/cm3, with tensile strength and elongation of 16.5 kpsi and 6.8%.

EXAMPLE 27 AND COMPARATIVE EXAMPLE V - BTDA/PPD

EXAMPLE 27

Para-phenylenediamine, 22.51 g was dissolved in 750 mL of pyridine at 60° C. 3,4,3',4'-Benzophenonetetracarboxylic dianhydride, 66.54 g was added together with a 20 mL rinse of pyridine to give a 10.3% polymer solution. A solution of inherent viscosity of 0.55 dl/g (in pyridine) was formed. The exotherm of the polymerization brought the temperature of the solution up to 74° C. The temperature of the solution was heated to 80° C. for 1.3 hours. The solution was then cooled to about 60° C. and precipitated into methylene chloride in a one-quart size blender operated at room temperature and at medium speed. About 450 mL of methylene chloride was used for every 150 mL of polyamide acid solution. The precipitation was instantaneous and quantitative and the resulting slurry was filtered and washed with methylene chloride. The filter cake was dried for 15 hours at 160° C. and 25" of mercury vacuum under a nitrogen purge. The dried resin was ground through a 30-mesh screen in a laboratory scale Wiley Mill. The dried resin was fabricated into tensile bars (ASTM E8) at room temperature and 100,000 psi forming pressure. The tensile bars were then free sintered for three hours at 380° C. under 1 atmosphere with nitrogen purge. The resultant tensile bars showed tensile strength and elongation of 19.3 kpsi and 3.5% respectively.

The above procedure was repeated, except that precipitation was carried out in (a) ethyl acetate (b) acetone and (c) 1:1 mixture of hexanes and ethyl acetate.

Tensile strength/elongation are 18.3/3.2; 12.3/2.0 and 16.5/3.2 respectively.

COMPARATIVE EXAMPLE V

Para-phenylenediamine, 11.06 g, was dissolved in 225 g of pyridine. The solution was warmed to 62° C. and 32.70 g of 3,4,3',4'-benzophenonetetracarboxylic dianhydride was added together with 20 mL of pyridine to give a 14.4% by weight polymer solution with an inherent viscosity of 0.74 dl/g. The temperature of the solution rose to 82° C. The polyamide acid was stirred at 80° C. for 0.5h, and then added dropwise to a flask containing 100 mL of pyridine at reflux. After completion of addition of the polyamide acid solution, the solution was refluxed for another 3 hours. The resultant suspension was filtered and washed with 5 cake-volumes of acetone. The filter cake was dried for 15 hours at 180° C. under 25" of mercury vacuum under a nitrogen purge. The dried resin was ground through a 30-mesh screen in a Wiley Mill. The dried resin was fabricated into tensile bars at room temperature and at 100,000 kpsi forming pressure. The bars were then free sintered for three hours at 380° C. under 1 atmosphere with nitrogen purge. The resultant tensile bars exhibited tensile strength and elongation of 4.9 kpsi and 0.5%.

COMPARATIVE EXAMPLES W-X
-BTDA/MPD
EXAMPLE-W

Meta-phenylenediamine, 16.31 g, was dissolved in 370 mL of pyridine at 60° C. 3,4,3',4'-Benzophenonetetracarboxylic dianhydride, 48.37 g, was added together with a 20 mL rinse of pyridine to give a 14.5% polymer solution. A solution of inherent viscosity of 0.34 dl/g (in pyridine) was formed. The exotherm of the polymerization brought the temperature of the solution up to 81° C. The temperature of the solution was stirred at 80° C. for 3.5h. The solution was then cooled to about 40° C. and precipitated into a methylene chloride in a one-quart size blender operated at room temperature and at medium speed. About 400 mL of the non-solvent, methylene chloride, was used for every 80 mL of polyamide acid solution. The precipitation was instantaneous and quantitative and the resulting slurry was filtered and washed with methylene chloride. The filter cake was dried for 15 hours at 160° C. and 25" of mercury vacuum under a nitrogen purge. The dried resin was ground through a 30-mesh screen in a laboratory scale Wiley Mill. The dried resin was fabricated into tensile bars (ASTM E8) at room temperature and 40,000 psi forming pressure. The tensile bars were then free sintered for three hours at 360° C. under 1 atmosphere with nitrogen purge. The resultant tensile bars showed tensile strength and elongation of 20.1 kpsi and 5.3% respectively.

The above procedure was repeated escept that the non-solvent was replaced by (a) ethyl acetate (b) acetone and (c) a 1:1 mixture of hexanes and ethyl acetate. The tensile strengths/elongation of the parts molded from the corresponding resins are (a) 17.1 kpsi, 5.4% (b) 16.7 kpsi, 5.5 % and (c) 10.2 kpsi, 3.6% respectively.

COMPARATIVE EXAMPLE X

Meta-phenylenediamine, 11.06 g, was dissolved in 225 mL of pyridine at 55° C. 3,4,3',4'-Benzophenonetetracarboxylic dianhydride, 32.96 g, was added together with a 20 mL rinse of pyridine to give a 14.5% polymer solution A solution of inherent viscosity of 0.35 dl/g (in pyridine) was formed. The exotherm of the polymerization brought the temperature of the solution up to 77° C. The polyamide acid was stirred at 75° C. for 0.5h, and then added dropwise to a flask containing 100 mL of pyridine at reflux. After completion of addition of the polyamide acid solution, the solution was refluxed for another 3.5 hours. The resultant suspension was filtered and washed with 3 cake-volumes of acetone. The filter cake was dried for 15 hours at 150° C. under 25" of mercury vacuum under a nitrogen purge. The dried resin was ground through a 30-mesh screen in a Wiley Mill. The dried resin was fabricated into tensile bars at room temperature and at 100,000 kpsi forming pressure. The bars were then free sintered for three hours at 350° C. under 1 atmosphere with nitrogen purge. The resultant tensile bars show tensile strength and elongation of 16.8 kpsi and 3.0%.

COMPARATIVE EXAMPLES Y & Z - BTDA/ODA

EXAMPLE Y

Oxydianiline, 34.41 g was dissolved in 750 mL of pyridine at 55° C. 3,4,3',4'-Benzophenonetetracarboxylic dianhydride, 54.93 g was added together with a 20 mL rinse of pyridine to give a 10.4% polymer solution. A solution of inherent viscosity of 0.60 dl/g (in pyridine) was formed. The exotherm of the polymerization brought the temperature of the solution up to 66° C. The temperature of the solution was heated to 90° C. for 3 hours. The solution was then cooled to about 60° C. and precipitated into ethyl acetate in a one-quart size blender operated at room temperature and at medium speed. About 400 mL of ethyl acetate was used for every 150 mL of polyamide acid solution. The precipitation was instantaneous and quantitative and the resulting slurry was filtered and washed with methylene chloride. The filter cake was dried for 15 hours at 160° C. and 25" of mercury vacuum under a nitrogen purge. The dried resin was ground through a 30-mesh screen in a laboratory scale Wiley Mill. The dried resin was fabricated into tensile bars (ASTM E8) at room temperature and 100,000 psi forming pressure. The tensile bars were then free sintered for three hours at 350° C. under 1 atmosphere with nitrogen purge. The resultant tensile bars showed tensile strength and elongation of 17.9 kpsi and 11.5% respectively.

The above procedure was repeated, except that the precipitation was carried out in (a)acetone (b) 1:2 mixture ethyl acetate and hexanes (c)methylene chloride. The results are 17.5/12.7; 17.0/10.1 and 17.3/10.1 respectively.

COMPARATIVE EXAMPLE Z

Oxydianiline, 16.85 g, was dissolved in 225 g of pyridine. The solution was warmed to 59° C. and 26.90 g of 3,4,3',4'-benzophenonetetracarboxylic dianhydride was added together with 20 mL of pyridine to give a 14.4% by weight polymer solution with an inherent viscosity of 0.82 dl/g. The temperature of the solution rose to 75° C. The polyamide acid was stirred at 75° C. for 0.75h, and then added dropwise to a flask containing 100 mL of pyridine at reflux. After completion of addition of the polyamide acid solution, the solution was refluxed for another 3.5 hours. The resultant suspension was filtered and washed with 3 cake-volumes of acetone. The filter cake was dried for 15 hours at 150° C. under 25" of mercury vacuum under a nitrogen purge. The dried resin was ground through a 30-mesh screen in a Wiley Mill. The dried resin was fabricated into tensile bars at room temperature and at 100,000 kpsi forming pressure. The bars were then free sintered for three hours at 380° C. under 1 atmosphere with nitrogen purge. The resultant tensile bars show tensile strength and elongation of 20.9 kpsi and 12.9%.

EXAMPLE 28 AND COMPARATIVE EXAMPLE AA - PMDA/MPD

EXAMPLE 28

Meta-phenylene diamine, 10.05 g, was dissolved in 320 mL of pyridine at 40° C. Pyromellitic dianhydride, 20.17 g was added together with a 20 mL rinse of pyridine to give a 8.3% polymer solution. A solution of inherent viscosity of 0.7 dl/g (in pyridine) was formed. The exotherm of the polymerization brought the temperature of the solution up to 62° C. The temperature of the solution was heated to 70° C. for 40 minutes.

The solution was then cooled to 65° C. and precipitated into methylene chloride in a one-quart size blender operated at room temperature and at medium speed. About 400 mL of methylene chloride was used for every 120 mL of polyamide acid solution. The precipitation was instantaneous and quantitative and the resulting slurry was filtered and washed with methylene chloride. The filter cake was dried for 15 hours at 160° C. and 25" of mercury vacuum under a nitrogen purge. The dried resin was ground through a 30-mesh screen in a laboratory scale Wiley Mill. The dried resin was fabricated into tensile bars (ASTM E8) at room temperature and 100,000 psi forming pressure to give bars of density of 1.25 g/cm3. The tensile bars were then free sintered for three hours at 405° C. under 1 atmosphere with nitrogen purge. The resultant tensile bars exhibit tensile strength and elongation of 17.3 kpsi and 12.7% respectively.

The above procedure was repeated, except that Precipitation was carried out in (a) acetone and in (b) ethyl acetate. The results obtained are (a) 17.4 kpsi/7.8% and (b) 17.5 kpsi/11.1% respectively.

COMPARATIVE EXAMPLE AA

Meta-phenylene diamine, 10.12 g was dissolved in 200 mL of pyridine. The solution was kept at ambient temperature and pyromellitic dianhydride, 20.47 g was added together with 20 mL of pyridine to give a 12.4% by weight polymer solution with an inherent viscosity of 1.03 dL/g. The temperature of the solution rose to 53° C. The polyamide acid was stirred at 60° C. for 0.5h, and then added dropwise using an addition funnel to flask containing 100 mL of pyridine at reflux. After completion of addition of the polyamide acid solution, the solution was refluxed for another 2.5 hours. The resultant suspension was filtered and washed with 3 cake-volumes of acetone. The filter cake was dried for 15 hours at 150° C. under 25" of mercury vacuum under a nitrogen purge. The dried resin was ground through a 30-mesh screen in a Wiley Mill. The dried resin was fabricated into tensile bars at room temperature and at 100,000 kpsi forming pressure. The bars were then free sintered for three hours at 405° C. under 1 atmosphere with nitrogen purge. The resultant tensile bars exhibit tensile strength and elongation of 5.3 kpsi and 1.2%.

The properties of the polyimides resulting from Examples 24–28 and Comparative Examples Q–AA are summarized in Table IV.

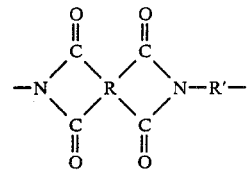

wherein R is a tetravalent radical containing at least one 6-carbon atom ring characterized by benzenoid unsaturation and wherein the four carbonyl groups are attached directly to different carbon atoms in the radical and wherein each pair of carbonyl groups is attached to adjacent carbon atoms in a 6-membered benzenoid ring of the radical and wherein R' is a divalent radical containing at least one six-carbon atom ring, each ring characterized by benzenoid unsaturation, and, when at least two rings are present in R', no more than one of the valence bonds is located on any one of the rings, the particles having a surface area of greater than 20 square meters per gram, the improvement wherein the polyimide repeating unit contains less than two flexible linkages and is substantially amorphous.

2. A molded article of the polyimide of claim 1 having a density of at least about 1.30 g/cc and containing less than about 2% filler and which exhibits a tensile elongation of greater than about 20% and a tensile strength of greater than about 12 kpsi.

3. A molded article of the polyimide of claim 1 having a density of at least about 1.30 g/cc and containing less than about 10% filler and which exhibits a tensile elongation of greater than about 18% and a tensile strength of greater than about 11.5 kpsi.

4. A molded article of the polyimide of claim 1 having a density of at least about 1.30 g/cc and containing less than about 50% filler and which exhibits a tensile elongation of greater than about 4% and a tensile strength of greater than about 7 kpsi.

5. A molded article of claim 2 wherein the filler is graphite.

6. In a process for the preparation of a solid particulate polyimide by the reaction of (1) at least one organic

TABLE IV

| Example | Monomers | Tensile Strength (kpsi) | | | Elongation (percent) | | | Surface Area (m²/g) | | Improvement? |
|---------|----------|------|-----|----------|------|-----|----------|------|-----|-----|
|         |          | New  | Old | % Change | New  | Old | % Change | New  | Old |     |
| 24/Q    | PMDA/PPD | 7.5  | 3.2 | +134     | 1.0  | 0.3 | +233     | 46   | 139 | yes |
| R/S     | PMDA/APB | 16.1 | 13.2| +22      | 7.4  | 5.7 | +31      | 47   | —   | little |
| 25      | BPDA/PPD | 20.9 | 6.9 | +203     | 4.3  | 0.9 | +378     | 49   | 7   | yes |
| 26      | BPDA/ODA | 17.1 | 16.5| +4       | 21.0 | 6.8 | +209     | 37   | 19  | yes |
| W       | BTDA/PPD | 19.3 | 4.9 | +294     | 3.5  | 0.5 | +600     | 67   | 146 | yes |
| Y/Z     | BTDA/MPD | 20.1 | 16.8| +20      | 5.3  | 3.0 | +77      | 44   | 104 | little |
| 28/AA   | BTDA/ODA | 17.9 | 20.9| −14      | 11.5 | 12.9| −11      | 32   | 87  | none |
| /AA     | PMDA/MPD | 17.3 | 5.3 | +226     | 12.7 | 1.1 | +1055    | —    | —   | yes |

We claim:

1. In a solid particulate polyimide, the polyimide having the recurring unit diamine of the formula H 2 N—R'—NH 2, wherein R' is a divalent radical containing at least one six-carbon atom ring, each ring characterized by benzenoid unsaturation, and, when at least two rings are present in R', no more than one valence bond is located on any one of said rings, and (2) at least one tetracarboxylic acid dianhydride and converting the resulting product to polyimide, the improvement which comprises:

(a) reacting the diamine and the dianhydride in a solvent having a pH of about from 8.0 to 10.0;

(b) maintaining the concentration of the solution resulting from the reaction of the tetracarboxylic acid dianhydride and the organic diamine at about from 1 to 15% polymer;

(c) bringing the polymer solution into contact with a nonsolvent for the resulting polymer at a temperature of about from 0° to 65° C.;

(d) maintaining the ratio of the nonsolvent and original polymer solvent such that the combined solvent and nonsolvent solvent; and (e) agitating the mixture of polymer solution and nonsolvent to bring the nonsolvent and the solution into intimate contact so as to provide a surface area in the polyimide resin of greater than about 20 square meters per gram.

7. A process of claim 6 wherein the concentration of the solution resulting from the reaction of the tetracarboxylic acid dianhydride and the organic diamine is maintained at about from 1 to 10% polymer.

8. A process of claim 6 wherein the solvent is pyridine.

9. A process of claim 6 wherein the solvent is beta-picoline.

10. A process of claim 6 wherein the concentration of the solution resulting from the tetracarboxylic acid dianhydride and the organic diamine is less than about 10%.

11. A process of claim 6 wherein the polymer solution is brought into contact with the nonsolvent at a temperature of about from 10° to 40° C.

* * * * *

UNITED STATES PATENT OFFICE
CERTIFICATE OF CORRECTION

PATENT NO. : 4,755,555
DATED : July 5, 1988
INVENTOR(S) : Carl H. Manwiller and Waifong L. Anton It is certified that error appears in the above-identified patent and that said Letters Patent are hereby corrected as shown below:

Column 21, line 11, between "nonsolvent" and "solvent" insert --contains no more than about 70%--.

Signed and Sealed this

Twenty-ninth Day of November, 1988

Attest:

DONALD J. QUIGG

*Attesting Officer*  *Commissioner of Patents and Trademarks*